US012304021B2

(12) United States Patent
Iida et al.

(10) Patent No.: US 12,304,021 B2
(45) Date of Patent: May 20, 2025

(54) DETERMINING TOOL AND SHAPE DETERMINING METHOD

(71) Applicant: DISCO CORPORATION, Tokyo (JP)

(72) Inventors: Katsubumi Iida, Tokyo (JP); Hirotoshi Hoshikawa, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 544 days.

(21) Appl. No.: 17/813,995

(22) Filed: Jul. 21, 2022

(65) Prior Publication Data

US 2023/0032327 A1 Feb. 2, 2023

(30) Foreign Application Priority Data

Aug. 2, 2021 (JP) .................. 2021-126525

(51) Int. Cl.
*B23Q 17/20* (2006.01)
*B23Q 17/09* (2006.01)

(52) U.S. Cl.
CPC ......... *B23Q 17/20* (2013.01); *B23Q 17/0995* (2013.01)

(58) Field of Classification Search
CPC .... B23Q 17/20; B23Q 17/22; B23Q 17/2233; B23Q 17/2457
USPC .......................................................... 33/201
See application file for complete search history.

(56) References Cited

U.S. PATENT DOCUMENTS

| | | | | | |
|---|---|---|---|---|---|
| 2,926,345 | A | * | 2/1960 | Roeger | B23Q 17/22 409/80 |
| 4,170,158 | A | * | 10/1979 | Weaver | B23Q 17/2233 83/486.1 |
| 4,494,434 | A | * | 1/1985 | Young | B23Q 9/005 83/745 |
| 4,693,038 | A | * | 9/1987 | Vetter | B23Q 15/013 451/6 |
| 4,831,365 | A | * | 5/1989 | Thomas | B23Q 17/0961 73/104 |
| 5,148,730 | A | * | 9/1992 | McCaw | B23Q 9/0042 83/522.18 |
| 5,197,365 | A | * | 3/1993 | Clifton | B23Q 17/22 83/522.19 |
| 6,434,852 | B1 | * | 8/2002 | Tarris | B23Q 17/2241 33/640 |

(Continued)

FOREIGN PATENT DOCUMENTS

| | | |
|---|---|---|
| JP | 05253837 A | 10/1993 |
| JP | 2000087282 A | 3/2000 |

(Continued)

OTHER PUBLICATIONS

Office Action issued in counterpart German patent application No. 10 2022 207 637.0, dated Aug. 21, 2024.

*Primary Examiner* — George B Bennett
(74) *Attorney, Agent, or Firm* — GREER BURNS & CRAIN, LTD.

(57) ABSTRACT

A determining tool for use in determining the shape of the tip end of a machining tool that machines a workpiece held on a table while the machining tool moves relatively to the table includes a bottom surface adapted to be held on the table and a flat slanting surface inclined to the bottom surface and oriented across a direction in which the machining tool moves relatively to the table, the flat slanting surface being adapted to be cut through by the tip end of the machining tool.

12 Claims, 11 Drawing Sheets

(56) References Cited

U.S. PATENT DOCUMENTS

| | | | | |
|---|---|---|---|---|
| 6,978,552 B1* | 12/2005 | Sluder | ............... | B23D 59/002 |
| | | | | 33/640 |
| 7,677,955 B2* | 3/2010 | Kajiyama | ............... | B24B 1/00 |
| | | | | 451/449 |
| 8,160,738 B2* | 4/2012 | Nishikawa | ............ | G01B 21/04 |
| | | | | 700/193 |
| 10,265,787 B2* | 4/2019 | Lawlor | ............ | B23Q 17/2233 |
| 10,786,925 B1* | 9/2020 | Barker | ............... | G01N 21/00 |
| 10,919,122 B2* | 2/2021 | Hegele | ............... | B23Q 15/00 |
| 11,007,615 B2* | 5/2021 | Isobe | ............... | B23Q 3/15526 |
| 11,162,899 B2* | 11/2021 | Teshima | ............ | G01N 21/8851 |
| 11,285,576 B2* | 3/2022 | Morihashi | ............ | B23Q 15/12 |
| 11,577,353 B2* | 2/2023 | Yasukochi | ....... | G05B 19/40937 |
| 11,738,420 B2* | 8/2023 | Wheeler | ............... | B27C 5/10 |
| | | | | 144/144.52 |
| 11,752,587 B2* | 9/2023 | Trifoni | ............... | B23Q 9/0007 |
| | | | | 33/626 |
| 11,919,114 B2* | 3/2024 | Nomaru | ............ | B23Q 17/2428 |
| 12,228,906 B2* | 2/2025 | Wu | ............... | G05B 19/401 |
| 2021/0027440 A1* | 1/2021 | Sakuyama | ......... | G01N 21/9515 |
| 2021/0379681 A1* | 12/2021 | Dano | ............ | G05B 19/4069 |
| 2022/0397387 A1* | 12/2022 | Oda | ............... | B23Q 17/2233 |
| 2023/0052650 A1* | 2/2023 | Gerber | ............... | B23Q 17/20 |
| 2024/0181588 A1* | 6/2024 | Gass | ............... | B23Q 17/22 |
| 2024/0399534 A1* | 12/2024 | Akiyama | ............... | B24B 47/22 |

FOREIGN PATENT DOCUMENTS

| | | |
|---|---|---|
| JP | 2007296604 A | 11/2007 |
| JP | 2015030089 A | 2/2015 |

* cited by examiner

DETERMINING TOOL AND SHAPE DETERMINING METHOD

BACKGROUND OF THE INVENTION

Field of the Invention

The present invention relates to a determining tool for use in determining the shape of the tip end of a machining tool and a shape determining method that uses the determining tool.

Description of the Related Art

Device chips including such devices as electronic circuits are indispensable components in electronic devices, typically mobile phones and personal computers. Device chips are produced by demarcating a plurality of areas on a face side of a wafer made of a semiconductor material such as silicon with projected dicing lines or streets, forming devices in the respective areas, and dividing the wafer along the projected dicing lines.

For dividing a plate-shaped workpiece typified by a wafer into small pieces such as device chips, there has been used a cutting apparatus having a machining tool referred to as a cutting blade that is made of abrasive grains dispersed in a binder, for example. The cutting apparatus operates as follows. The cutting blade is rotated at a high speed and caused to cut into the workpiece along projected dicing lines thereon while such a liquid as pure water is supplied to the workpiece, thereby dividing the workpiece into a plurality of small pieces (see, for example, JP 2000-87282A).

SUMMARY OF THE INVENTION

When a machining tool such as a cutting blade machines a workpiece, the machining tool has its tip end worn into a round shape as the machining step progresses. If the machining tool with the round tip end is used to machine a workpiece, the round shape of the tip end of the machining tool is transferred to the workpiece, making it impossible for the machining tool to machine the workpiece to a desired shape. In addition, the round tip end of the machining tool tends to make the machining tool lower in mechanical strength and asymmetrical in shape, with the results that, while the machining tool is in use, the machining tool cutting into the workpiece is liable to vibrate, lowering the quality of the machining step.

One solution is to perform a shape determining step by having a machining tool cut into a flat plate-shaped object and observing the shape of a machining mark left on the plate-shaped object by the machining tool from one side of the plate-shaped object and thereby determine whether or not the tip end of the machining tool is round. However, the shape determining step is tedious and takes a long period of time until it is completed because the plate-shaped object needs to be repositioned with respect to a camera or the like in order to observe the shape of the machining mark from one side of the plate-shaped object by using the camera.

It is therefore an object of the present invention to provide a determining tool that is capable of simply determining the shape of the tip end of a machining tool and a shape determining method that uses the determining tool.

In accordance with an aspect of the present invention, there is provided a determining tool for use in determining the shape of the tip end of a machining tool that machines a workpiece held on a table while the machining tool moves relatively to the table. The determining tool includes a bottom surface adapted to be held on the table and a flat slanting surface inclined to the bottom surface and oriented across a direction in which the machining tool moves relatively to the table, the flat slanting surface being adapted to be cut through by the tip end of the machining tool.

Preferably, an angle formed between the bottom surface and the slanting surface is in a range of 30° to 60°. Preferably, the determining tool is made of silicon or carbon.

In accordance with another aspect of the present invention, there is provided a shape determining method of determining the shape of the tip end of a machining tool that machines a workpiece held on a table while the machining tool moves relatively to the table. The method includes holding, on the table, a bottom surface of a determining tool that includes the bottom surface and a flat slanting surface inclined to the bottom surface, causing the tip end of the machining tool to cut into the determining tool in such a manner as to cut through the slanting surface while the slanting surface is directed across a direction in which the machining tool moves relatively to the table, and checking the shape of a machining mark left on the slanting surface by the tip end of the machining tool that has cut through the slanting surface, from a side of the determining tool that is opposite to the bottom surface, thereby determining the shape of the tip end of the machining tool.

Preferably, the causing the tip end of the machining tool to cut into the determining tool includes causing the tip end of the machining tool to cut into the determining tool while the tip end of the machining tool stays clear of an end of the slanting surface that is closer to the bottom surface. Preferably, the causing the tip end of the machining tool to cut into the determining tool includes causing the tip end of the machining tool to cut into the determining tool while moving the machining tool and the table relatively to each other in the abovementioned direction. Preferably, the determining the shape of the tip end of the machining tool includes determining that the tip end of the machining tool is round, if an end of the machining mark checked from the side of the determining tool that is opposite to the bottom surface is curved.

As described above, the determining tool according to the aspect of the present invention has the bottom surface adapted to be held on the table and the flat slanting surface inclined to the bottom surface and adapted to be cut through by the tip end of the machining tool. Accordingly, simply by causing the tip end of the machining tool to cut into the determining tool in such a manner as to have the tip end cut through the slanting surface, leaving the machining mark on the slanting surface, the shape of the machining mark can easily be checked from the side of the determining tool that is opposite to the bottom surface.

With the determining tool according to the aspect of the present invention and the shape determining method according to the other aspect of the invention, it is not necessary to reposition the determining tool when the shape of the machining mark that is complementary in shape to the tip end of the machining tool is to be checked. Therefore, the determining tool and the shape determining method make it possible to determine the shape of the tip end of the machining tool more easily than heretofore.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
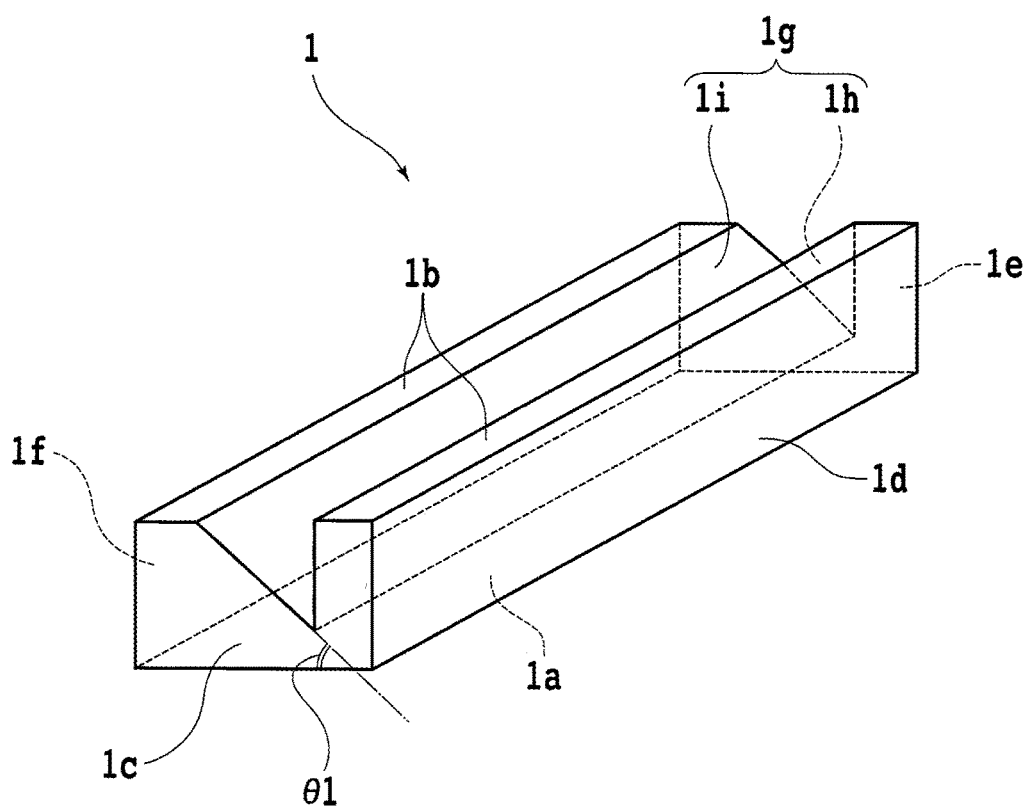
FIG. 1 is a perspective view schematically illustrating the structure of a determining tool according to an embodiment of the present invention.

A preferred embodiment of the present invention will be described in detail below with reference to the accompanying drawings. FIG. 1 schematically illustrates in perspective the structure of a determining tool 1 according to the present embodiment. As illustrated in FIG. 1, the determining tool 1 has a generally flat, rectangular bottom surface 1a and an upper surface 1b that is opposite to the bottom surface 1a, and is used in determining the shape of the tip end of a machining tool or a grindstone tool made of abrasive grains dispersed in a binder, for example.

The bottom surface 1a has portions, i.e., end portions, on respective four sides of the rectangular shape that are joined to the respective sides of the upper surface 1b through respective side surfaces 1c, 1d, 1e, and 1f. The bottom surface 1a and the upper surface 1b lie generally parallel to each other. The side surfaces 1c, 1d, 1e, and 1f extend generally perpendicularly to the bottom surface 1a and the upper surface 1b.

The determining tool 1 has a longitudinal groove 1g defined therein that extends generally parallel to the portions of the bottom surface 1a that correspond to the respective two sides adjoining the side surfaces 1d and 1f. The groove 1g has an upper end that is open at the upper surface 1b and longitudinally opposite ends that reach and are open at the side surfaces 1c and 1e. The groove 1g divides the upper surface 1b into a first portion positioned near and joined to the side surface 1d and a second portion positioned near and joined to the side surface 1f.

The groove 1g has, i.e., is defined by, a vertical surface 1h extending generally perpendicularly to the bottom surface 1a and the upper surface 1b and generally parallel to the side surface 1d, and a slanting surface 1i inclined to the bottom surface 1a and the upper surface 1b. The slanting surface 1i lies generally flatwise at a predetermined angle with respect to the bottom surface 1a or the upper surface 1b.

Specifically, the slanting surface 1i is inclined to the bottom surface 1a or the upper surface 1b at an angle θ1. The angle θ1 is essentially not limited to any values. However, if the angle θ1 is in a range of 30° to 60° (30° or more and 60° or less), then it allows a user to check the shape of the tip end of the machining tool reliably from the upper surface 1b. Further, if the angle θ1 is in a range of 43° to 48°, or typically of 45°, then the user can check the shape of the tip end of the machining tool more precisely from the upper surface 1b.

The determining tool 1 may be manufactured by any of various different processes. For example, the determining tool 1 may be manufactured by forming the groove 1g in a plate-shaped workpiece according to a desired step such as cutting, laser processing, and etching. The determining tool 1 may be made of any of various materials insofar as the selected material can easily be machined by a machining tool used.

However, if the determining tool 1 is made of a material having many pores therein such as a porous material, then a machining mark left on the slanting surface 1i by a machining tool covers some pores, which may possibly prevent the shape of the machining mark from being checked to a nicety. Therefore, the determining tool 1 is preferably made of a relatively dense material free of many pores, such as silicon or carbon, for example.

Figure 2:
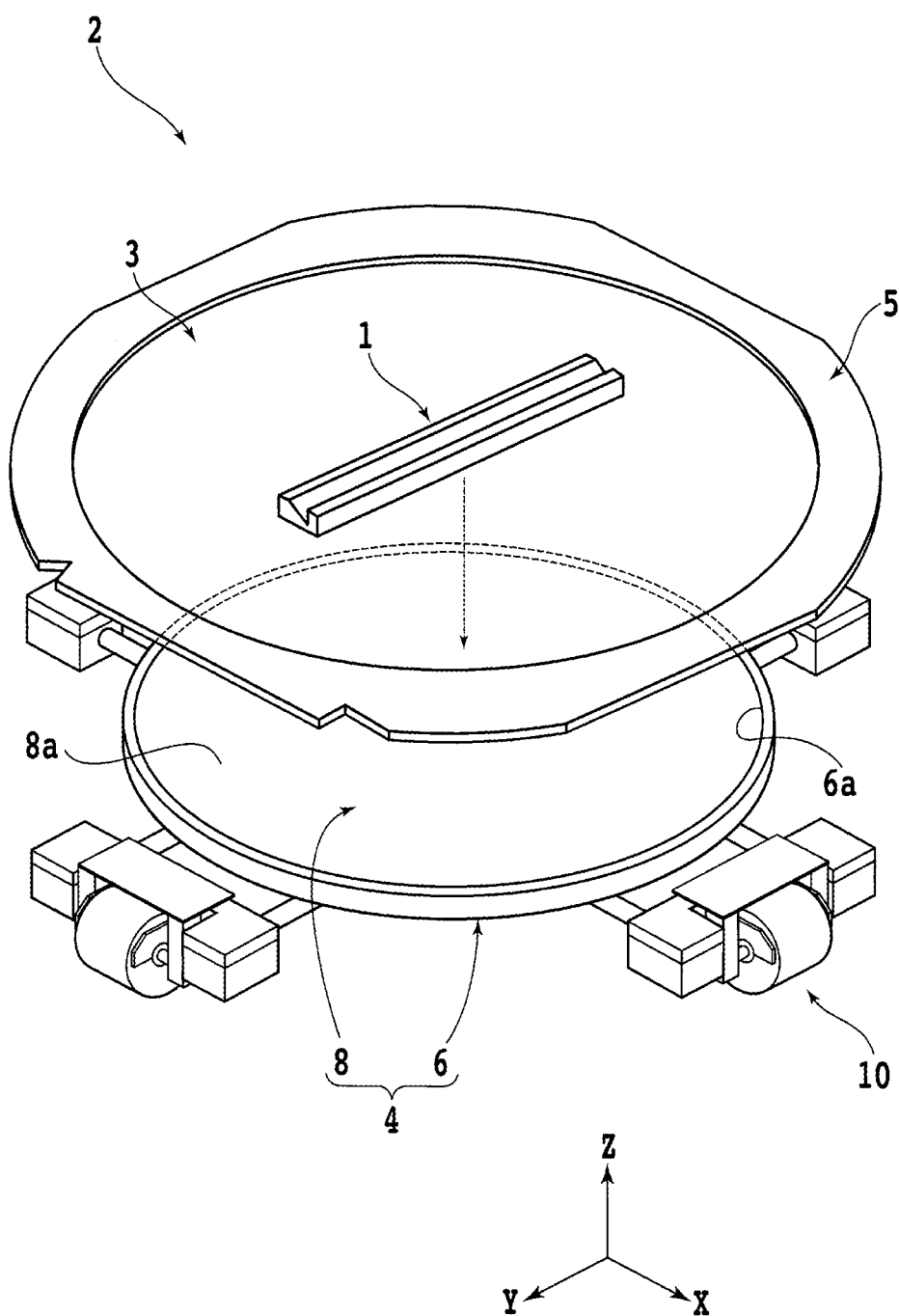
FIG. 2 is a perspective view schematically illustrating the manner in which the determining tool is held on a table.

A shape determining method of determining the shape of the tip end of a machining tool by using the determining tool 1 described above will be described below. In the shape determining method according to the present embodiment, initially, the bottom surface 1a of the determining tool 1 is held on a table of a processing apparatus (holding step). FIG. 2 schematically illustrates in perspective the manner in which the determining tool 1 is held on a table, i.e., a chuck table, 4 of a cutting apparatus, i.e., a processing apparatus, 2.

As illustrated in FIG. 2, the cutting apparatus 2 used in the present embodiment includes the table 4 for holding a plate-shaped workpiece, not illustrated, that may typically be a semiconductor wafer. The table 4 includes a disk-shaped frame 6 made of metal, typically stainless steel, for example. The frame 6 has a cavity 6a defined in an upper surface thereof. The cavity 6a has a circular opening in its upper end.

The table 4 also includes a porous, disk-shaped holding plate 8 that is made of ceramic or the like and that is fixedly mounted in the cavity 6a. The holding plate 8 has a generally flat upper surface 8a functioning as a holding surface for holding the workpiece thereon. The holding plate 8 has a lower surface, not illustrated, that is fluidly connected to a suction source, not illustrated, such as an ejector through a fluid channel, not illustrated, defined in the frame 6, a valve, not illustrated, etc.

For machining a workpiece on the cutting apparatus 2, a circular tape, i.e., a dicing tape, larger in diameter than the workpiece is affixed to a lower surface of the workpiece. The tape has an outer circumferential edge portion fixed to an annular frame that surrounds the workpiece. When the workpiece is placed on the table 4, the annular frame is clamped by four clamps 10 disposed around the frame 6.

The frame 6 has a lower portion connected to a rotary actuator, not illustrated, such as an electric motor. When the rotary actuator is energized, it generates rotary power to rotate the table 4 and the clamps 10 around an axis, i.e., a rotational axis, extending through the center of the upper surface 8a along vertical directions, i.e., Z-axis directions, generally perpendicular to the upper surface 8a. The frame 6 is supported on a table moving mechanism, not illustrated, for moving the table 4 along processing feed directions, i.e., X-axis directions, generally parallel to the upper surface 8a.

As illustrated in FIG. 2, the determining tool 1 is supported on an annular frame 5 by a circular tape, i.e., a dicing tape, 3 affixed to the annular frame 5, with the bottom surface 1a facing the tape 3. For using the determining tool 1 in determining the shape of the tip end of a machining tool used on the cutting apparatus 2, the determining tool 1 that is supported on the annular frame 5 is held on the table 4 with the tape 3 interposed therebetween, so that the bottom surface 1a faces the table 4 through the tape 3. The tape 3 that is larger than the determining tool 1 is affixed to the bottom surface 1a of the determining tool 1 before the determining tool 1 is held on the table 4. The annular frame 5 is fixed to an outer circumferential edge portion of the tape 3 in such a manner as to surround the determining tool 1.

For holding the bottom surface 1a of the determining tool 1 on the table 4, a lower surface of the tape 3 affixed to the determining tool 1, i.e., a surface of the tape 3 that faces away from the determining tool 1, is brought into contact with the upper surface 8a of the holding plate 8. Then, the annular frame 5 fixed to the outer circumferential edge portion of the tape 3 is clamped by the four clamps 10. The valve is opened to apply a negative pressure generated by the suction source to the table 4. The bottom surface 1a of the determining tool 1 is now held under suction on the table 4 through the tape 3 interposed therebetween, with the upper surface 1b being exposed upwardly.

Figure 3:
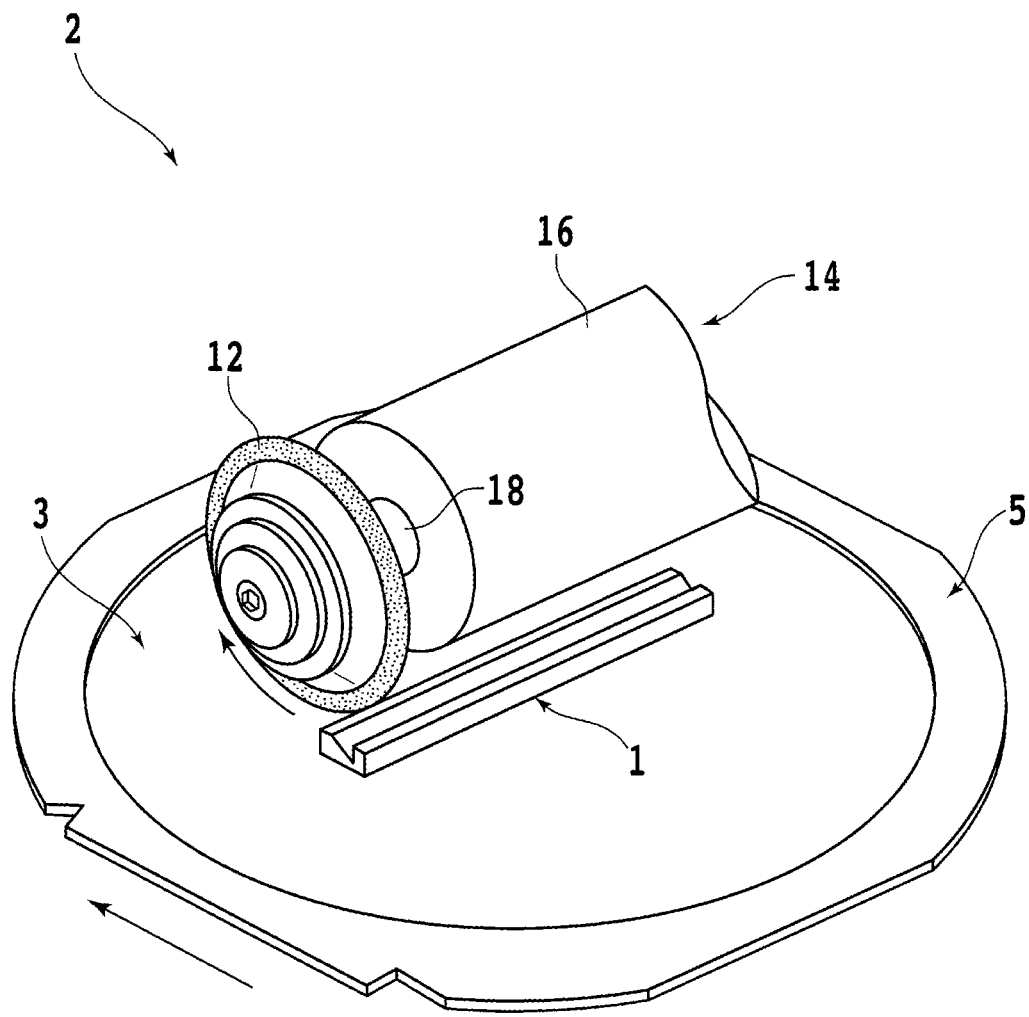
FIG. 3 is a perspective view schematically illustrating the manner in which the tip end of a cutting blade is caused to cut into the determining tool.

After the bottom surface 1a of the determining tool 1 has been held on the table 4, the tip end of a machining tool used on the cutting apparatus 2 is caused to cut into the determining tool 1 through the slanting surface 1i (cutting step). FIG. 3 schematically illustrates in perspective the manner in which the tip end of a cutting blade, i.e., a machining tool, 12 used on the cutting apparatus 2 is caused to cut into the determining tool 1. In FIG. 3, the table 4 and other components for holding the determining tool 1 are omitted from illustration for the sake of brevity.

As illustrated in FIG. 3, the cutting apparatus 2 includes a cutting unit, i.e., a machining unit, 14 disposed above the determining tool 1 held on the table 4. The cutting unit 14 includes a tubular spindle housing 16 and a spindle 18 partly housed in the tubular spindle housing 16. The spindle 18 is rotatable about an axis, i.e., a rotational axis, extending generally parallel to indexing feed directions, i.e., Y-axis directions, that are generally perpendicular to the processing feed directions, i.e., the X-axis directions, and the vertical directions, i.e., the Z-axis directions.

The spindle 18 has an end portion that is exposed out of the spindle housing 16 and that supports a cutting blade 12 mounted thereon. The cutting blade 12 is made of abrasive grains of diamond or the like dispersed in a binder made of resin, metal, or the like. The spindle 18 has an opposite end coupled to a rotary actuator, not illustrated, such as an electric motor. When the rotary actuator is energized, it generates rotary power to rotate the spindle 18 and hence the cutting blade 12 about the rotational axis.

The spindle housing 16, i.e., the cutting unit 14, is supported on a cutting unit moving mechanism, not illustrated, for example. The cutting unit moving mechanism moves the cutting unit 14 along the indexing feed directions and the vertical directions.

The cutting apparatus 2 machines, i.e., cuts, a workpiece held on the table 4 as follows. After the cutting unit 14 has been positionally adjusted along the vertical directions, the table 4 is moved in one of the processing feed directions while the cutting blade 12 is rotated, and the cutting blade 12 is caused to cut into the workpiece on the table 4, thereby cutting the workpiece. Therefore, the cutting apparatus 2 according to the present embodiment machines the workpiece on the table 4 by moving the cutting blade 12 relatively to the table 4 that is holding the workpiece.

When the cutting apparatus 2 is used in combination with the determining tool 1 to determine the shape of the tip end, i.e., the cutting edge, of the cutting blade 12, the cutting blade 12 is caused to cut into the determining tool 1. For causing the cutting blade 12 to cut into the determining tool 1, the bottom surface 1a of the determining tool 1 is held under suction on the table 4 through the tape 3 interposed therebetween, with the upper surface 1b being exposed upwardly. Then, the table 4 is adjusted in angular orientation about its rotational axis to direct the slanting surface 1i of the determining tool 1 transversely across the processing feed directions, i.e., directions along which the cutting blade 12 and the table 4 move relatively to each other. Specifically, the angular orientation of the table 4 about its rotational axis is adjusted to direct the longitudinal axis of the groove 1g, i.e., the slanting surface 1i or the vertical surface 1h, transversely across the processing feed directions, i.e., directions along which the cutting blade 12 and the table 4 move relatively to each other.

The angle formed between the processing feed directions and the longitudinal axis of the groove 1g is not limited to any values. However, the closer the angle is to 90°, the easier it is to check the shape of the tip end of the cutting blade 12. Typically, the angular orientation of the table 4 about its rotational axis is preferably adjusted to keep the angle formed between the processing feed directions and the longitudinal axis of the groove 1g in a range of 85° to 95°, i.e., in a range of 90°±5°, so that the shape of the tip end of the cutting blade 12 can appropriately be checked.

After the angular orientation of the table 4 has been adjusted or before the angular orientation of the table 4 is adjusted, the cutting unit 14 is adjusted in vertical position. Specifically, the vertical position of the cutting unit 14 is adjusted to keep the height of the tip end, i.e., the lower end, of the cutting blade 12 smaller than the height of an upper end, i.e., an end closer to the upper surface 1b, of the slanting surface 1i of the determining tool 1. In addition, the vertical position of the cutting unit 14 is adjusted to keep the height of the tip end, i.e., the lower end, of the cutting blade 12 larger than the height of a lower end, i.e., an end closer to the bottom surface 1a, of the slanting surface 1i of the determining tool 1.

Figure 4:
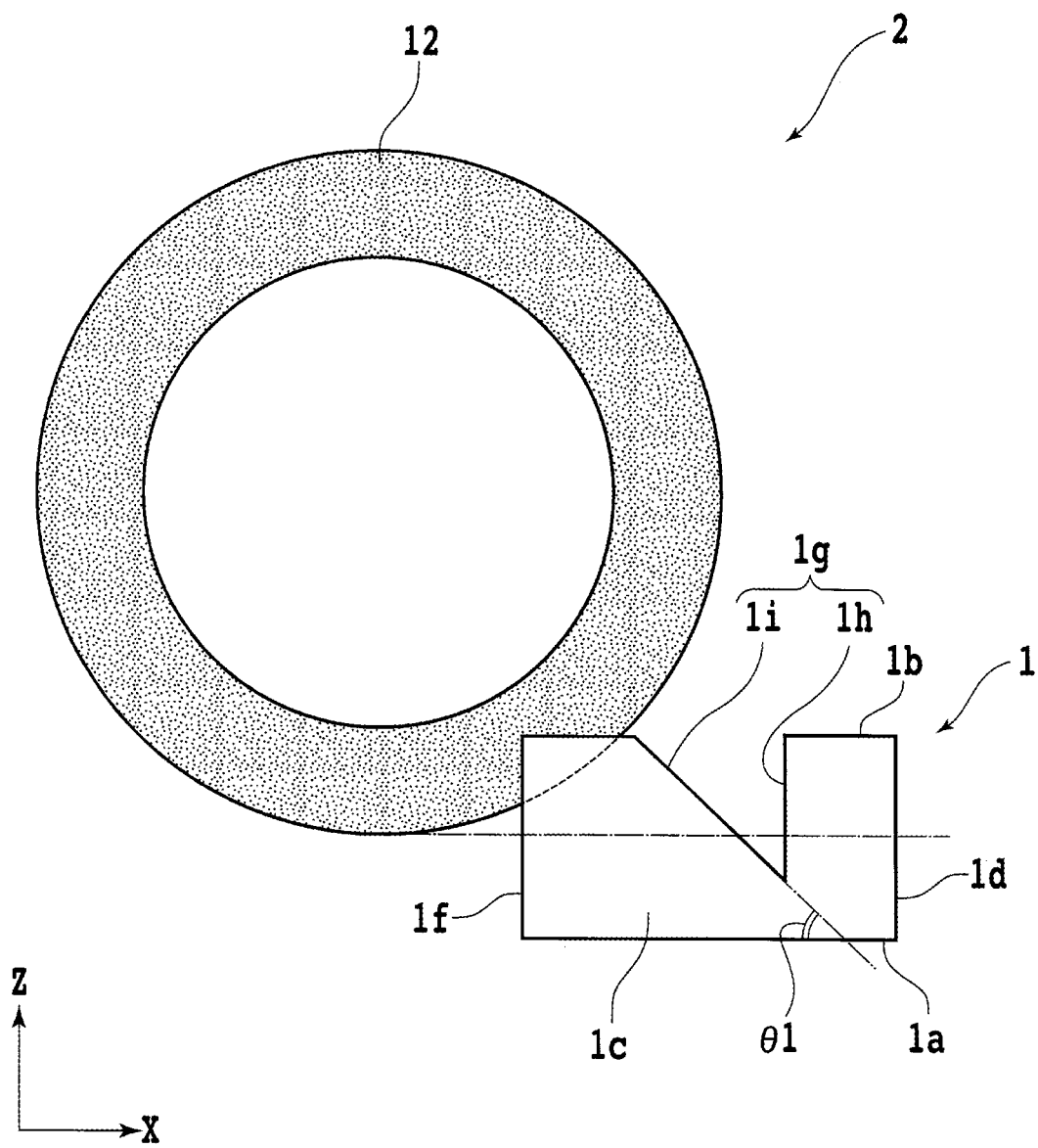
FIG. 4 is a side elevational view schematically illustrating the manner in which the tip end of the cutting blade is caused to cut into the determining tool.

Then, as illustrated in FIG. 3, the table 4 is moved in one of the processing feed directions while the cutting blade 12 is rotated, and the cutting blade 12 is caused to cut into the determining tool 1 on the table 4. FIG. 4 schematically illustrates in side elevation the manner in which the tip end of the cutting blade 12 is caused to cut into the determining tool 1. In FIG. 4, only the determining tool 1 and the cutting blade 12 are illustrated for the sake of brevity.

The orientation of the slanting surface 1i and the height of the cutting blade 12 with respect to the slanting surface 1i have been adjusted as described above. Therefore, when the cutting blade 12 is caused to cut into the determining tool 1, the tip end of the cutting blade 12 cuts through the slanting surface 1i while staying clear of the lower end of the slanting surface 1i, i.e., the end closer to the bottom surface 1a. As a result, a machining mark shaped complementarily to the shape of the tip end of the cutting blade 12 is left on the slanting surface 1i of the determining tool 1.

Figure 5:
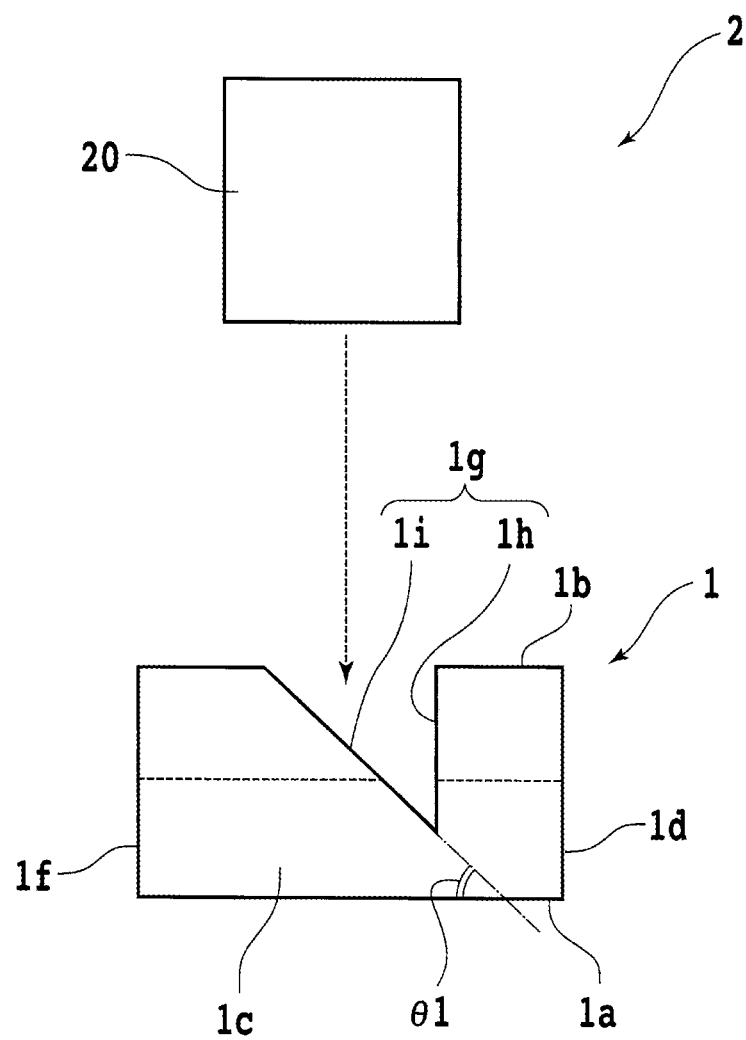
FIG. 5 is a side elevational view schematically illustrating the manner in which the shape of a machining mark left on a slanting surface of the determining tool is checked.

After the machining mark has been left on the slanting surface 1i, the shape of the machining mark is checked from the upper surface 1b, i.e., the surface opposite to the bottom surface 1a, of the determining tool 1, thereby determining the shape of the tip end of the cutting blade 12 (shape determining step). FIG. 5 schematically illustrates in side elevation the manner in which the shape of the machining mark left on the slanting surface 1i of the determining tool 1 is checked. In FIG. 5, only main components necessary for checking the shape of the machining mark are illustrated for the sake of brevity.

As illustrated in FIG. 5, a camera 20 for capturing an image of the determining tool 1 is disposed above the determining tool 1 held on the table 4. The camera 20 includes a two-dimensional sensor such as a complementary metal oxide semiconductor (CMOS) image sensor or a charge-coupled device (CCD) image sensor which is sensitive to visible light, for example, and is fixed to the cutting unit 14. The camera 20 is thus movable in unison with the cutting unit 14 by the cutting unit moving mechanism, which is referred to above, along the indexing feed directions and the vertical directions.

Figure 6:
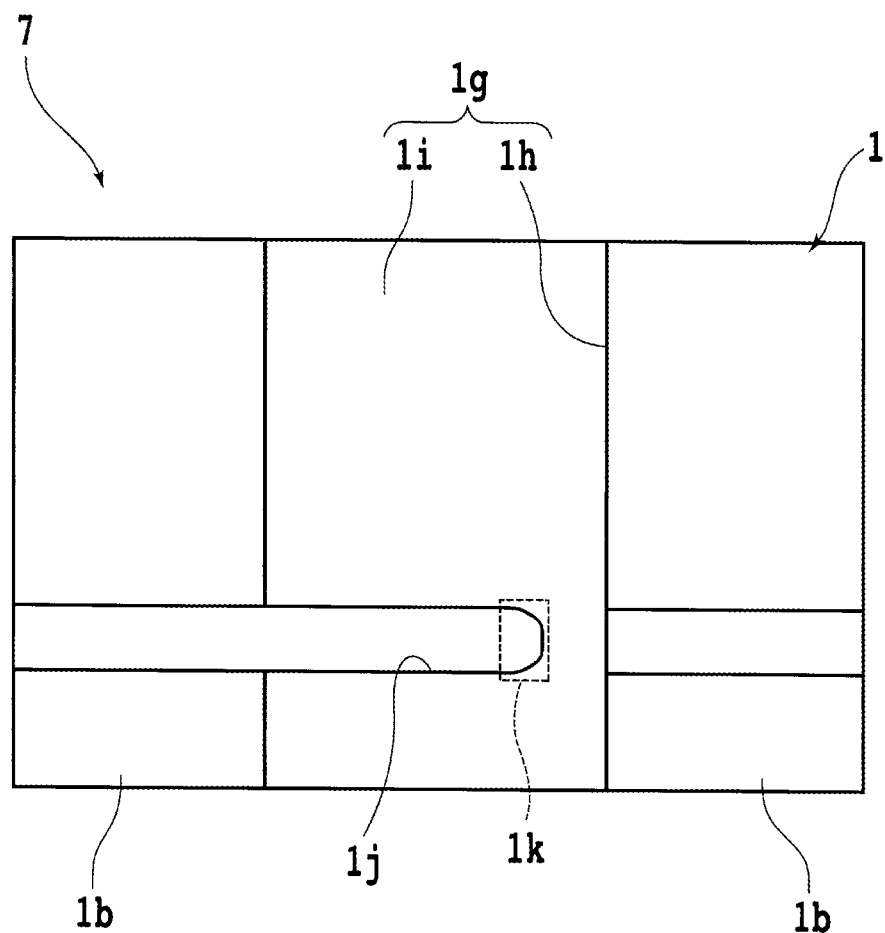
FIG. 6 is a view illustrating by way of example an image of the machining mark left on the slanting surface of the determining tool, the image being captured by a camera.

For checking the shape of the machining mark left on the slanting surface 1i from the upper surface 1b, the position of the table 4 and the position of the camera 20 are adjusted to place the camera 20 directly above the machining mark, for example. Then, the camera 20 captures an image of an area of the slanting surface 1i that includes the machining mark, from above the determining tool 1, i.e., above the upper surface 1b opposite to the bottom surface 1a. FIG. 6 illustrates by way of example an image 7 of the machining mark, denoted by 1j, that is left on the slanting surface 1i of the determining tool 1, the image 7 being captured by the camera 20.

As described above, the slanting surface 1i of the determining tool 1 is inclined to the bottom surface 1a of the determining tool 1 held on the table 4. Therefore, the camera 20 can capture the image 7, which includes the machining mark 1j that reflects the shape of the tip end of the cutting blade 12, of the slanting surface 1i of the determining tool 1 from above the table 4. Then, the shape of the tip end of the cutting blade 12 is determined on the basis of the shape of the machining mark 1j included in the image 7.

If an end 1k of the machining mark 1j at the lower end of the slanting surface 1i that is closer to the vertical surface 1h in the image 7 is curved, as illustrated in FIG. 6, then it is determined that the tip end of the cutting blade 12 has been curved and hence round. In other words, it is determined that the tip end of the cutting blade 12 has lost its corners due to wear. On the other hand, 1f the end 1k of the machining mark 1j at the lower end of the slanting surface 1i is straight, i.e., is of an angular shape with corners, then it is determined that the tip end of the cutting blade 12 has retained its corners.

The shape of the tip end of the cutting blade 12 is determined by processing the image 7 by a control unit, not illustrated, i.e., a computer, that controls the cutting apparatus 2. An operator of the cutting apparatus 2 is notified of the determined result from the control unit through an indicating device, not illustrated, such as a warning lamp that gives off light, a speaker that radiates sound, or a display unit that displays information, for example. However, the shape of the tip end of the cutting blade 12 may be determined subjectively by the operator. According to the latter alternative, the camera 20 may not be required to capture the image 7, and the operator may check the shape of the machining mark 1j with the operator's own eyes.

As described above, the determining tool 1 according to the present embodiment has the bottom surface 1a placed on the table 4 and the flat slanting surface 1i inclined to the bottom surface 1a and adapted to be cut through by the tip end of the cutting blade 12. Accordingly, simply by causing the cutting blade 12 to cut into the determining tool 1 in such a manner as to have the tip end thereof cut through the slanting surface 1i, leaving the machining mark 1j on the slanting surface 1i, the shape of the machining mark 1j can easily be checked from the upper surface 1b, which is opposite to the bottom surface 1a, of the determining tool 1.

With the determining tool 1 according to the present embodiment and the shape determining method using the determining tool 1, it is not necessary to reposition the determining tool 1 when the shape of the machining mark 1j that is complementary in shape to the tip end of the cutting blade 12 is to be checked. Therefore, the determining tool 1 and the shape determining method make it possible to determine the shape of the tip end of the cutting blade 12 more easily than heretofore.

The present invention is not limited to the above embodiment, and various changes and modifications may be made. For example, according to the above embodiment, the shape of the tip end of the cutting blade, i.e., the machining tool, 12 is determined on the basis of the machining mark left on the slanting surface 1i of the determining tool 1. However, such a deformation as a curvature of the cutting blade 12 may be determined in a similar fashion. In order to easily determine such a deformation as a curvature of the cutting blade 12, a side wall of the determining tool 1 that includes the vertical surface 1h may preferably be machined into a stepped configuration, i.e., a configuration having a plurality of steps.

Further, according to the above embodiment, the cutting blade 12 is moved relatively to the table 4 in one of the processing feed directions to cause itself to cut into the determining tool 1. However, the cutting blade 12 may be moved relatively to the table 4 downwardly in one of the vertical directions to cause itself to cut into the determining tool 1, thereby causing the tip end of the cutting blade 12 to cut through the slanting surface 1i.

Moreover, according to the above embodiment, the tape 3 is affixed to the bottom surface 1a of the determining tool 1, and the bottom surface 1a of the determining tool 1 is held on the table 4 with the tape 3 interposed therebetween. However, a plate made of resin or the like may be affixed to the bottom surface 1a of the determining tool 1, and the bottom surface 1a of the determining tool 1 may be held on the table 4 with the plate or the like interposed therebetween.

In addition, according to the above embodiment, the cutting blade 12 is caused to cut into only the determining tool 1. However, a dresser board for use in dressing the cutting blade 12, for example, may be disposed in the vicinity of the determining tool 1, and the cutting blade 12 may be caused to cut into the dresser board and the determining tool 1, so that the cutting blade 12 can be dressed by the dresser board and the shape of the tip end of the cutting blade 12 can also be determined from the determining tool 1. Similarly, a workpiece may be disposed in the vicinity of the determining tool 1, and thus, the shape of the tip end of the cutting blade 12 can be determined from the determining tool 1, and machining failures of the workpiece, typically chippings, can be detected from the workpiece.

Figure 7:
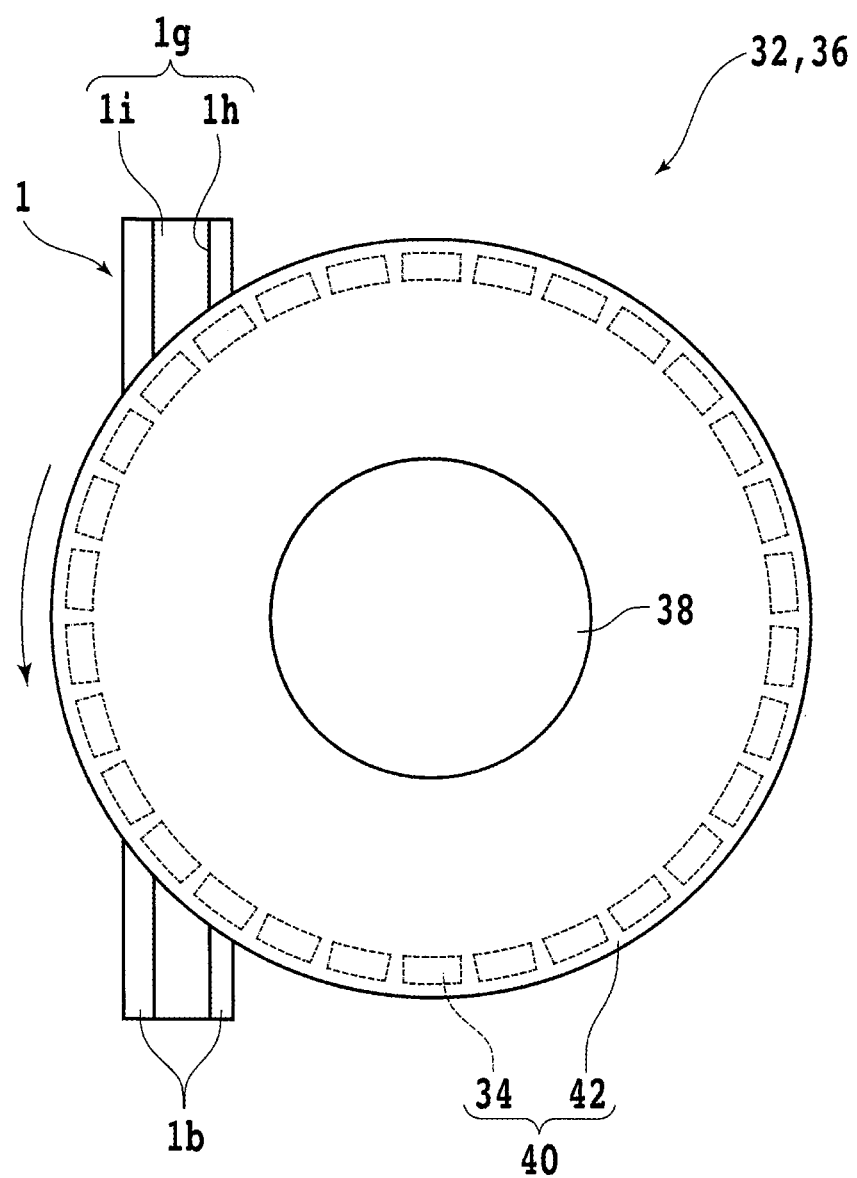
FIG. 7 is a plan elevational view schematically illustrating the manner in which the tip end of grindstones is caused to cut into the determining tool.

Furthermore, according to the above embodiment, the shape of the tip end of the cutting blade 12 is checked by using the determining tool 1. However, the determining tool 1 may also be used to determine the shape of the tip end of another machining tool. FIG. 7 schematically illustrates in plan the manner in which the tip end of grindstones, i.e., a machining tool, 34 of a grinding apparatus, i.e., a processing apparatus, 32 is caused to cut into the determining tool 1. As with the cutting apparatus 2, the grinding apparatus 32 includes a table, i.e., a chuck table, not illustrated, for holding a plate-shaped workpiece, not illustrated, thereon.

The table has a lower portion connected to a rotary actuator, not illustrated, such as an electric motor. When the rotary actuator is energized, it generates rotary power to rotate the table around an axis, i.e., a rotational axis, extending through the center of the table along vertical directions or directions slightly tilted from the vertical directions. The table is supported on a table moving mechanism, not illustrated, for moving the table along horizontal directions.

A grinding unit, i.e., a machining unit, 36 is disposed above the table. The grinding unit 36 includes a tubular spindle housing, not illustrated, and a spindle 38 partly housed in the tubular spindle housing. The spindle 38 is rotatable about an axis, i.e., a rotational axis, extending generally parallel to the vertical directions.

The spindle 38 has a lower end portion that is exposed out of the spindle housing and that supports a grinding wheel 40 mounted thereon. The grinding wheel 40 includes a disk-shaped base 42 having an upper surface connected to a lower end of the spindle 38 and a plurality of grindstones, i.e., a machining tool, 34 mounted in an annular array on a lower surface of the base 42.

The spindle 38 has an upper end coupled to a rotary actuator, not illustrated, such as an electric motor. When the rotary actuator is energized, it generates rotary power to rotate the spindle 38 about a central axis thereof. Therefore, the grindstones 34 are rotated in unison with the spindle 38 around the central axis of the spindle 38.

The spindle housing and hence the grinding unit 36 are supported on a grinding unit moving mechanism, not illustrated, for moving the grinding unit 36 along the vertical directions.

The grinding apparatus 32 machines, i.e., grinds, a workpiece held on the table as follows. After the table holding the workpiece thereon has been moved to a position below the grinding wheel 40, the grinding wheel 40 and the table are rotated, and the grinding unit 36 is lowered to bring the grindstones 34 into abrasive contact with the workpiece on the table, thereby grinding the workpiece. Therefore, the grinding apparatus 32 machines the workpiece on the table by moving the grindstones 34 relatively to the table that is holding the workpiece.

A shape determining method of determining the shape of the tip end of the grindstones 34 is similar to the shape determining method of determining the shape of the tip end of the cutting blade 12 as described above. Specifically, initially, the bottom surface 1a of the determining tool 1 is held on the table of the grinding apparatus 32 (holding step). Details of the sequence of the holding step are similar to those of the holding step described above according to the above embodiment. The determining tool 1 is held on the table with a tape, not illustrated, interposed therebetween. However, it is not necessary to fix an annular frame to an outer circumferential edge portion of the tape.

Figure 8:
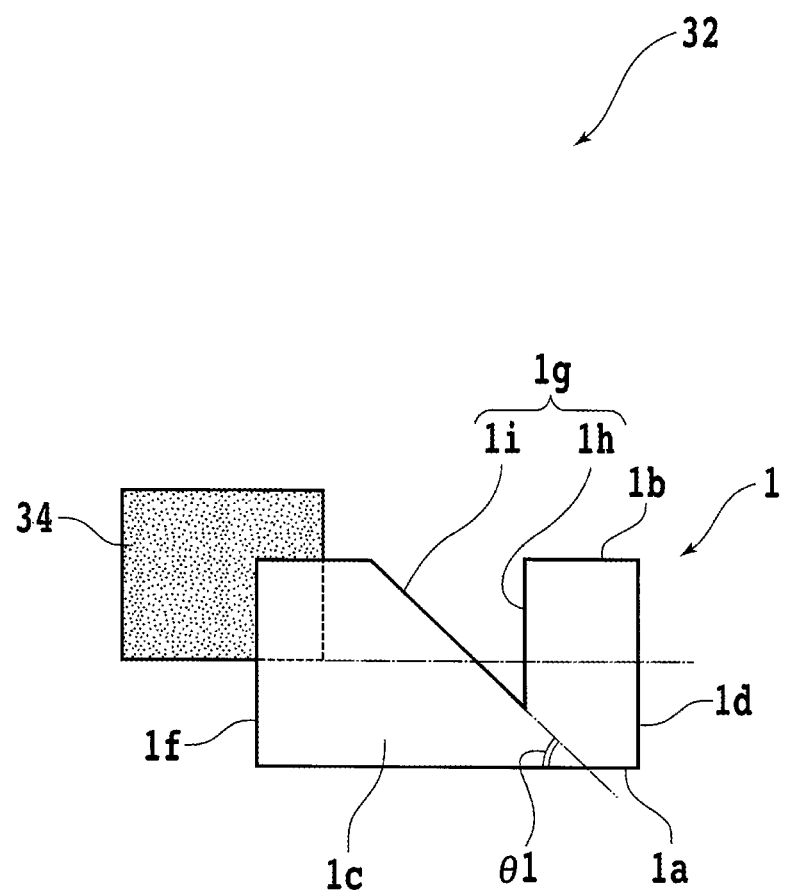
FIG. 8 is a side elevational view schematically illustrating the manner in which the tip end of the grindstones is caused to cut into the determining tool.

After the bottom surface 1a of the determining tool 1 has been held on the table, the tip end of the grindstones 34 is caused to cut into the determining tool 1 through the slanting surface 1i (cutting step). FIG. 8 schematically illustrates in side elevation the manner in which the tip end of the grindstones 34 is caused to cut into the determining tool 1. In FIG. 8, only the determining tool 1 and the grindstones 34 are illustrated for the sake of brevity.

For causing the tip end of the grindstones 34 to cut into the determining tool 1, the table is adjusted in angular orientation about its rotational axis to direct the slanting surface 1i of the determining tool 1 transversely across the direction in which the grindstones 34 move, i.e., the direction in which the grindstones 34 rotate about the central axis of the spindle 38 or the direction in which the grindstones 34 move relatively to the table. Specifically, the angular orientation of the table about its rotational axis is adjusted to direct the longitudinal axis of the groove 1g, i.e., the slanting surface 1i or the vertical surface 1h, transversely across the direction in which the grindstones 34 move.

After the angular orientation of the table has been adjusted, the grinding unit 36 is lowered while the grinding wheel 40 is rotated, causing the grindstones 34 to cut into the determining tool 1 on the table, as illustrated in FIG. 7. At this time, the table is not rotated. By rotating the grinding wheel 40 without rotating the table, the grindstones 34 are caused to cut through the slanting surface 1i from a certain direction.

Then, the grinding unit 36 stops being lowered when the height of the tip end, i.e., the lower end, of the grindstones 34 is larger than the height of the lower end, i.e., the end closer to the bottom surface 1a, of the slanting surface 1i of the determining tool 1. Therefore, when the grindstones 34 are caused to cut into the determining tool 1, the tip end of the grindstones 34 cuts through the slanting surface 1i while staying clear of the lower end of the slanting surface 1i. As a result, a machining mark shaped complementarily to the shape of the tip end of the grindstones 34 is left on the slanting surface 1i of the determining tool 1.

Figure 9:
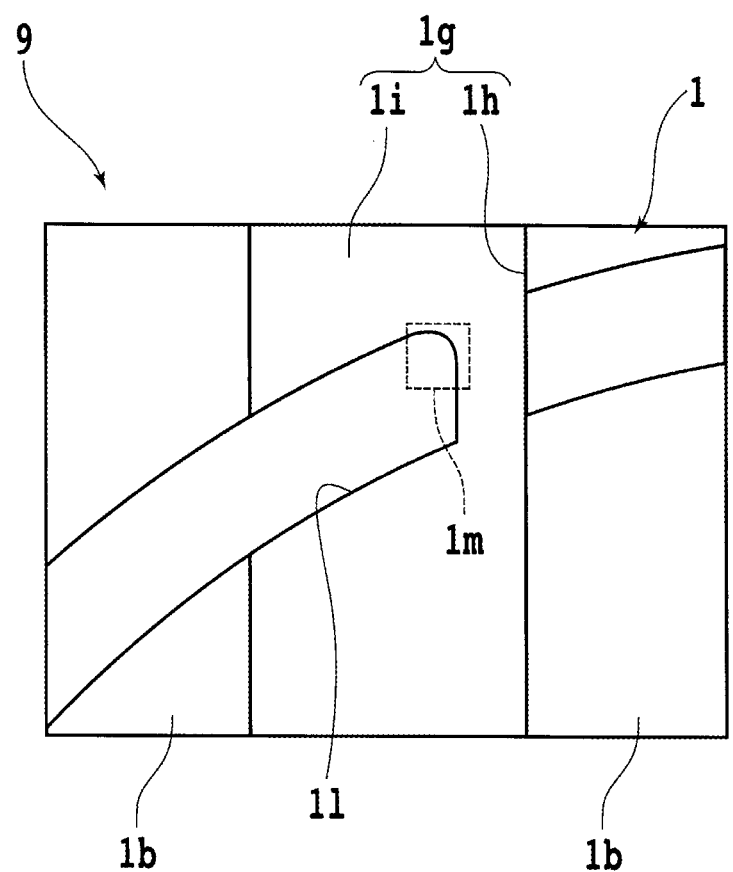
FIG. 9 is a view illustrating by way of example an image of the machining mark left on the slanting surface of the determining tool, the image being captured by a camera.

After the machining mark has been left on the slanting surface 1i, the shape of the machining mark is checked from the upper surface 1b, i.e., the surface opposite to the bottom surface 1a, of the determining tool 1, thereby determining the shape of the tip end of the grindstones 34 (shape determining step). Specifically, a camera, not illustrated, of the grinding apparatus 32 captures an image of an area of the slanting surface 1i that includes the machining mark. FIG. 9 illustrates by way of example an image 9 of the machining mark, denoted by 1l, left on the slanting surface 1i of the determining tool 1, the image 9 being captured by the camera.

As described above, the slanting surface 1i of the determining tool 1 is inclined to the bottom surface 1a of the determining tool 1 held on the table. Therefore, the camera can capture the image 9, which includes the machining mark 1l that reflects the shape of the tip end of the grindstones 34, of the slanting surface 1i of the determining tool 1 from above the table. Then, the shape of the tip end of the grindstones 34 is determined on the basis of the shape of the machining mark 1l included in the image 9.

If an end 1m of the machining mark 1l at the lower end of the slanting surface 1i that is closer to the vertical surface 1h in the image 9 is round as illustrated in FIG. 9, then it is determined that the tip end of the grindstones 34 has been curved and hence round. In other words, it is determined that the tip end of the grindstones 34 has lost its corners due to wear. On the other hand, if the end 1m of the machining mark 1*l* at the lower end of the slanting surface 1*i* is straight, i.e., is of an angular shape with corners, then it is determined that the tip end of the grindstones 34 has retained its corners.

The shape of the tip end of the grindstones 34 is determined by processing the image 9 by a control unit, not illustrated, i.e., a computer, that controls the grinding apparatus 32. The control unit can also calculate the width of the grindstones 34 by using the image 9 including the machining mark 1*l*.

An operator of the grinding apparatus 32 is notified of the determined result from the control unit through an indicating device, not illustrated, such as a warning lamp that gives off light, a speaker that radiates sound, or a display unit that displays information, for example. However, the shape of the tip end of the grindstones 34 may be determined subjectively by the operator. According to the latter alternative, the camera may not be required to capture the image 9, and the operator may check the shape of the machining mark 1*l* with the operator's own eyes.

According to the above embodiment, the determining tool 1 having the groove 1*g* defined by the vertical surface 1*h* and the slanting surface 1*i* is used to check the shape of the tip end of the cutting blade 12 or the grindstones 34 as a machining tool. The determining tool according to the present invention may be devoid of the groove 1*g*.

Figure 10:
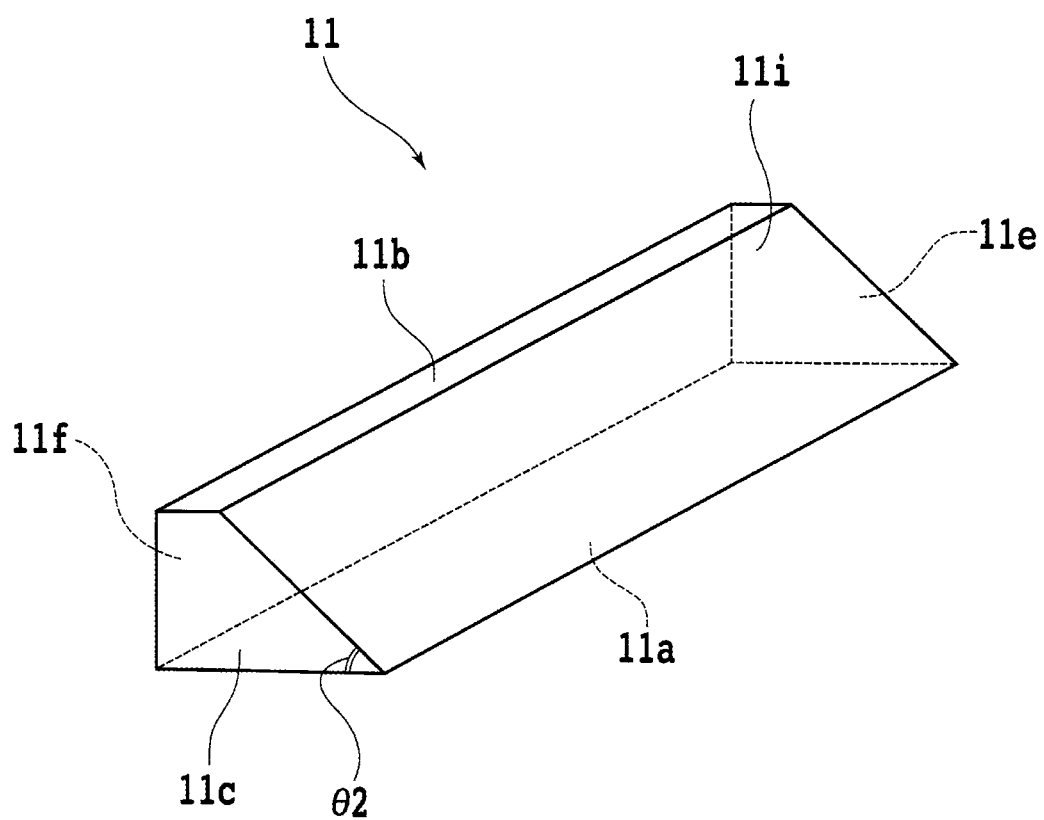
FIG. 10 is a perspective view schematically illustrating the structure of a determining tool according to a first modification of the embodiment of the present invention.

FIG. 10 schematically illustrates in perspective the structure of a determining tool 11 according to a first modification of the embodiment of the present invention. As illustrated in FIG. 10, the determining tool 11 according to the first modification has a generally flat, rectangular bottom surface 11*a* and an upper surface 11*b* that is opposite to the bottom surface 11*a*. The bottom surface 11*a* has portions, i.e., end portions, on respective four sides of the rectangular shape that are joined to the respective sides of the upper surface 11*b* through side surfaces 11*c*, 11*e*, and 11*f* and a slanting surface 11*i*.

The bottom surface 11*a* and the upper surface 11*b* lie generally parallel to each other. The side surfaces 11*c*, 11*e*, and 11*f* extend generally perpendicularly to the bottom surface 11*a* and the upper surface 11*b*. The slanting surface 11*i* lies generally flatwise at a predetermined angle with respect to the bottom surface 11*a* or the upper surface 11*b*, as with the slanting surface 1*i* according to the above embodiment.

An angle θ2 that is formed between the bottom surface 11*a* or the upper surface 11*b* and the slanting surface 11*i* is similar to the angle θ1 according to the above embodiment. The process of manufacturing the determining tool 11, the material of the determining tool 11, the way in which the determining tool 11 is used, and the shape determining method using the determining tool 11 are similar to those described according to the above embodiment. The determining tool 11 may be modified into the shape of a triangular prism free of the upper surface 11*b*.

Figure 11:
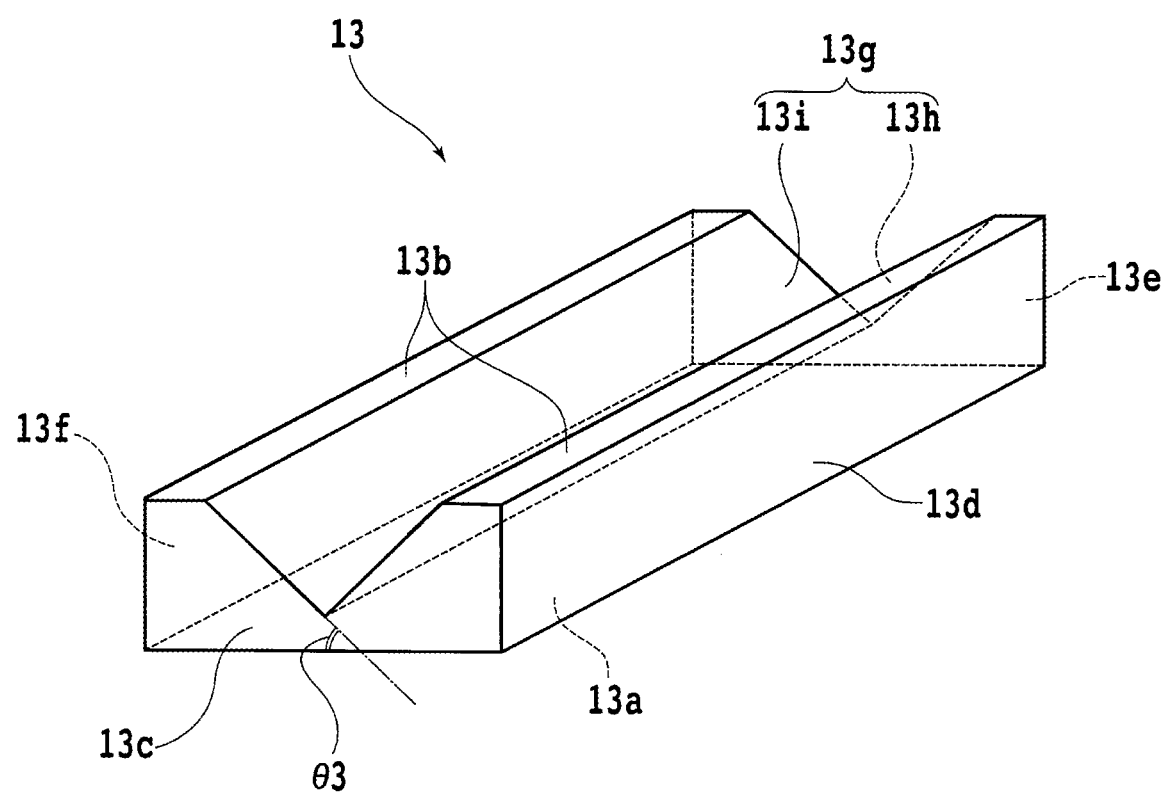
FIG. 11 is a perspective view schematically illustrating the structure of a determining tool according to a second modification of the embodiment of the present invention.

FIG. 11 schematically illustrates in perspective the structure of a determining tool 13 according to a second modification of the embodiment of the present invention. As illustrated in FIG. 11, the determining tool 13 according to the second modification has a generally flat, rectangular bottom surface 13*a* and an upper surface 13*b* that is opposite to the bottom surface 13*a*. The bottom surface 13*a* has portions, i.e., end portions, on respective four sides of the rectangular shape that are joined to the respective sides of the upper surface 13*b* through side surfaces 13*c*, 13*d*, 13*e*, and 13*f*.

The bottom surface 13*a* and the upper surface 13*b* lie generally parallel to each other. The side surfaces 13*c*, 13*d*, 13*e*, and 13*f* extend generally perpendicularly to the bottom surface 13*a* and the upper surface 13*b*. The determining tool 13 has a longitudinal groove 13*g* defined therein that extends generally parallel to the portions of the bottom surface 13*a* that correspond to the respective two sides adjoining the side surfaces 13*d* and 13*f*.

The groove 13*g* has an upper end that is open at the upper surface 13*b* and longitudinally opposite ends that reach and are open at the side surfaces 13*c* and 13*e*. The groove 13*g* divides the upper surface 13*b* into a first portion positioned near and joined to the side surface 13*d* and a second portion positioned near and joined to the side surface 13*f*.

The groove 13*g* has, i.e., is defined by, a slanting surface 13*h* inclined to the bottom surface 13*a* and the upper surface 13*b* and a slanting surface 13*i* inclined to the bottom surface 13*a* and the upper surface 13*b*. Each of the slanting surfaces 13*h* and 13*i* lies generally flatwise at a predetermined angle with respect to the bottom surface 13*a* or the upper surface 13*b*.

An angle θ3 that is formed between the bottom surface 13*a* or the upper surface 13*b* and the slanting surface 13*i* is similar to the angle θ1 according to the above embodiment. An angle that is formed between the bottom surface 13*a* or the upper surface 13*b* and the slanting surface 13*h* is also similar to the angle θ1. However, the angle that is formed between the bottom surface 13*a* or the upper surface 13*b* and the slanting surface 13*h* does not need to be the same as the angle θ3.

The process of manufacturing the determining tool 13, the material of the determining tool 13, the way in which the determining tool 13 is used, and the shape determining method using the determining tool 13 are similar to those described according to the above embodiment. The determining tool 13 makes it easier to check the shape of the tip end of a machining tool because, when the machining tool is caused to cut into the determining tool 13, it leaves machining marks on both the slanting surface 13*h* and the slanting surface 13*i*. The determining tool 13 may be modified into a shape free of the upper surface 13*b*.

The structural details and shape determining methods according to the above embodiment and modifications may be changed or modified without departing from the scope of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A determining tool for use in determining a shape of a tip end of a machining tool that machines a workpiece held on a table while the machining tool moves relatively to the table, the determining tool comprising:
   a bottom surface adapted to be held on the table; and
   a flat slanting surface inclined to the bottom surface and oriented across a direction in which the machining tool moves relatively to the table, the flat slanting surface being adapted to be cut through by the tip end of the machining tool.

2. The determining tool according to claim 1, wherein an angle formed between the bottom surface and the slanting surface is in a range of 30° to 60°.

3. The determining tool according to claim 1, wherein the determining tool is made of silicon or carbon.

4. The determining tool according to claim 2, wherein the determining tool is made of silicon or carbon.

5. A shape determining method of determining a shape of a tip end of a machining tool that machines a workpiece held on a table while the machining tool moves relatively to the table, the method comprising:
- holding, on the table, a bottom surface of a determining tool that includes the bottom surface and a flat slanting surface inclined to the bottom surface;
- causing the tip end of the machining tool to cut into the determining tool in such a manner as to cut through the slanting surface while the slanting surface is directed across a direction in which the machining tool moves relatively to the table; and
- checking a shape of a machining mark left on the slanting surface by the tip end of the machining tool that has cut through the slanting surface, from a side of the determining tool that is opposite to the bottom surface, thereby determining the shape of the tip end of the machining tool.

6. The shape determining method according to claim 5, wherein the causing the tip end of the machining tool to cut into the determining tool includes causing the tip end of the machining tool to cut into the determining tool while the tip end of the machining tool stays clear of an end of the slanting surface that is closer to the bottom surface.

7. The shape determining method according to claim 5, wherein the causing the tip end of the machining tool to cut into the determining tool includes causing the tip end of the machining tool to cut into the determining tool while moving the machining tool and the table relatively to each other in the abovementioned direction.

8. The shape determining method according to claim 6, wherein the causing the tip end of the machining tool to cut into the determining tool includes causing the tip end of the machining tool to cut into the determining tool while moving the machining tool and the table relatively to each other in the abovementioned direction.

9. The shape determining method according to claim 5, wherein the determining the shape of the tip end of the machining tool includes determining that the tip end of the machining tool is round, if an end of the machining mark checked from the side of the determining tool that is opposite to the bottom surface is curved.

10. The shape determining method according to claim 6, wherein the determining the shape of the tip end of the machining tool includes determining that the tip end of the machining tool is round, if an end of the machining mark checked from the side of the determining tool that is opposite to the bottom surface is curved.

11. The shape determining method according to claim 7, wherein the determining the shape of the tip end of the machining tool includes determining that the tip end of the machining tool is round, if an end of the machining mark checked from the side of the determining tool that is opposite to the bottom surface is curved.

12. The shape determining method according to claim 8, wherein the determining the shape of the tip end of the machining tool includes determining that the tip end of the machining tool is round, if an end of the machining mark checked from the side of the determining tool that is opposite to the bottom surface is curved.

* * * * *